(12) United States Patent
Manvi et al.

(10) Patent No.: US 9,197,622 B2
(45) Date of Patent: Nov. 24, 2015

(54) SECURELY TRACKING ELECTRONIC MESSAGES

(71) Applicant: CA, Inc., Islandia, NY (US)

(72) Inventors: Anand Manvi, Bangalore (IN); Venkata Babji Sama, Bangalore (IN); S. Balagiri Prasad, Bangalore (IN); Venkat Chaitanya Sama, Bangalore (IN)

(73) Assignee: CA, Inc., New York, NY (US)

(*) Notice: Subject to any disclaimer, the term of this patent is extended or adjusted under 35 U.S.C. 154(b) by 44 days.

(21) Appl. No.: 14/206,997

(22) Filed: Mar. 12, 2014

(65) Prior Publication Data

US 2015/0264022 A1 Sep. 17, 2015

(51) Int. Cl.
*H04L 29/06* (2006.01)
(52) U.S. Cl.
CPC .................................... *H04L 63/08* (2013.01)
(58) Field of Classification Search
CPC ......... H04L 63/08; H04L 63/10; H04L 63/20; H04L 29/06; H04L 63/0428
See application file for complete search history.

(56) References Cited

U.S. PATENT DOCUMENTS

| | | | |
|---|---|---|---|
| 7,774,414 B2* | 8/2010 | Shah | 709/206 |
| 7,912,908 B2 | 3/2011 | Cai et al. | |
| 8,341,726 B2 | 12/2012 | Denner et al. | |
| 2009/0031393 A1* | 1/2009 | Denner et al. | 726/1 |
| 2009/0228564 A1* | 9/2009 | Hamburg | 709/206 |
| 2011/0113109 A1* | 5/2011 | LeVasseur et al. | 709/206 |
| 2011/0202756 A1* | 8/2011 | West | 713/152 |
| 2012/0278620 A1* | 11/2012 | Singh et al. | 713/168 |

FOREIGN PATENT DOCUMENTS

| | | |
|---|---|---|
| EP | 2400442 A1 | 12/2011 |
| WO | 0117276 A2 | 3/2001 |

OTHER PUBLICATIONS

Allman et al., "SMTP Service Extension for Message Tracking," RFC 3885, Sep. 2004, 18 pages. Downloaded from the Internet http://www.rfc-editor.org/rfc/rfc3885.txt.
Allman, E., "An Extensible Message Format for Message Tracking Responses", RFC 3886, Sep. 2004, 11 pages. Downloaded from Internet http://www.rfc-editor.org/rfc/rfc3886.txt.
Hansen, T., "Message Tracking Query Protocol," RFC 3887, Sep. 2004, 23 pages. Downloaded from Internet http://www.rfc-editor.org/rfc/rfc3887.txt.
Hansen, T., "Message Tracking Model and Requirements," RFC 3888, Sep. 2004, 11 pages. Downloaded from Internet http://www.rfc-editor.org/rfc/rfc3888.txt.

* cited by examiner

*Primary Examiner* — Chau Le
*Assistant Examiner* — Ghodrat Jamshidi
(74) *Attorney, Agent, or Firm* — Vierra Magen Marcus LLP

(57) ABSTRACT

Techniques are disclosed herein for systematically tracking the entire forwarding flow of an electronic message, such as an email. A determination is made to track an electronic message prior to it being relayed to an intended recipient. When the electronic message is forwarded by the intended recipient, a feedback message is sent by the forwarder to the originator of the electronic message. This may be used to allow the original author to review and authorize recipients of the forwarded message. The original author need not know up front to whom the message might be forwarded. Note that this not only provides security, but also provides for fine grained system for tracking the flow of messages, such as sensitive emails. The system can automatically assess the risk of authorizing the recipient to whom the message was forwarded to have access to the content based on machine learning, rules, etc.

18 Claims, 10 Drawing Sheets

SECURELY TRACKING ELECTRONIC MESSAGES

BACKGROUND

The present disclosure relates to communicating between electronic devices, and in particular to securely tracking electronic messages.

Forwarding of electronic messages, such as e-mails, is a common practice. Forwarding refers to a recipient of an electronic message providing the electronic message through a communications network to an entity that was not an intended recipient of the electronic message.

Forwarding is clearly a very useful and efficient technique for sharing content of the electronic message. However, the originator of the electronic message might want to control to whom the content is disseminated. It can be difficult to provide the originator with such control, especially when the originator does not know to whom the electronic message might be forwarded at the time of message creation.

BRIEF SUMMARY

According to one aspect of the present disclosure a method of processing electronic messages is provided. The method may include the following. A determination is made to track a first electronic message that is received at a computer system is. The first electronic message comprises content and identifies an originator of the first electronic message and an intended recipient of the first electronic message. A second electronic message that is addressed for delivery to the originator is accessed at a computer system. A determination is made that the second electronic message is a feedback message that indicates that the first electronic message was forwarded by the intended recipient to a forwarded recipient. A forwarding history of the first electronic message is tracked. This includes storing the forwarding history in a storage device. The forwarding history indicates that the first electronic message was forwarded from the intended recipient to the forwarded recipient. The forwarded recipient was not intended by the originator as a recipient of the first electronic message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
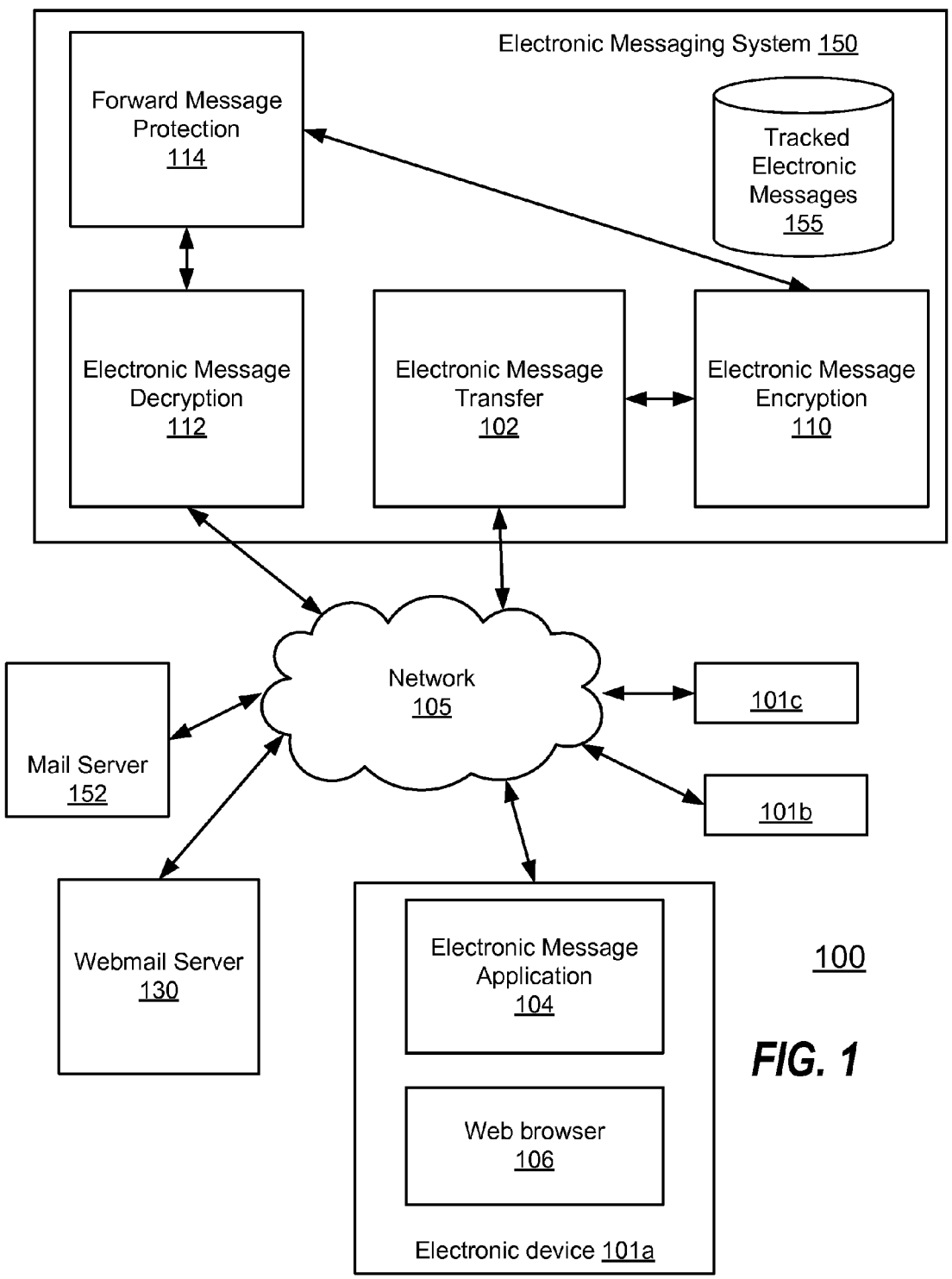
FIG. 1 illustrates a high-level block diagram of an apparatus or system comprising networked computing devices using secure user tracking of electronic messages according to an embodiment.

Techniques for securely tracking forwarded electronic messages, such as emails are disclosed herein. In some cases, a simple sender-recipient flow can be well protected through a pre-authorization step of the electronic message recipients by the original author or by the message system (e.g., an exchange server in an email system). However, the recipients of the original electronic message can further choose to share the information by forwarding the original electronic message. One such example is the forwarding of electronic mail or "email".

In the interest of maintaining the secrecy of the original electronic message, the message should be encrypted when it is forwarded. However, the next set of recipients will not be able to decrypt the electronic message if they are not pre-authorized by, for example, the original author. The forward chain can be very long, and the total list of recipients can be unknown at the time of origination. Furthermore, for situations in which the electronic message originates within an enterprise, the electronic message can go outside the enterprise message system (e.g., to partners, public mail servers, etc.).

Therefore, the complex flows that result out of electronic message forwarding poses challenges with respect to unintended leaks, especially when the electronic message recipients are outside the domain of the enterprise. The original author of the electronic message may not know or have control over how the information is being distributed.

Techniques are disclosed herein for systematically tracking the forwarding flow of an electronic message, such as an email. In one embodiment, a determination is made to track an electronic message prior to it being relayed to an intended recipient. This could be based on the electronic message being identified as being sensitive, based on where it is being sent, etc. When the electronic message is forwarded by the intended recipient, a feedback message is sent by the intended recipient. This feedback message may be addressed to the sender of the original electronic message. This feedback message may be received by an entity that is tracking the forwarding of the electronic message. This may be used to allow the original author to review and authorize recipients of the forwarded message. The original author need not know up front to whom the message might be forwarded. Note that this not only provides security, but also provides for fine grained system for tracking the flow of messages, such as sensitive emails. Further details are discussed herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated signal with computer readable program code embodied therein, for example, in baseband or as part of a carrier wave.

Propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a diagram of an environment 100 in which of securely tracking electronic messages may be practiced. Electronic messages including, but not limited to, emails may be exchanged between various electronic devices 101. One possible protocol for emails is the Simple Mail Transfer Protocol (SMTP). However, note that even if SMTP is used for a portion of email transfer, it is not required that all transfers be compliant with SMTP. For example, a proprietary protocol could be used within a particular email system.

The various electronic devices 101a-c have one or more software applications that may facilitate composing, sending, receiving, and reading electronic messages. The electronic devices 101 could be, but are not limited to, a cell phone, a laptop computer, a notebook computer, a tablet computer, a desktop computer, etc. Electronic device 101a is depicted as having an electronic message application 104 and a web browser 106, which may each facilitate working with electronic messages. The other electronic devices 101b and 101c may have one or both of these applications 104, 106.

The electronic message application 104 includes a mail user agent (MUA), in one embodiment. Mail user agents are well known and are sometimes referred to as email clients or email readers. The MUA may be locally installed on an electronic device 101. The electronic message application 104 may allow electronic messages to be composed, sent into network 105, received from network 105, and read or otherwise viewed.

Another option for working with electronic messages is a webmail program. The webmail server 130 runs a webmail program (not depicted in FIG. 1). A webmail program is an email client that is implemented as a web application accessed by a web browser 106. An electronic device 101 may have a web browser 106 to access the webmail program over the network 105 (e.g., the Internet). The webmail server 130 might store electronic messages locally, but that is not required.

The electronic messaging system 150 includes electronic message transfer (EMT) 102, electronic message encryption 110, electronic message decryption 112, and forward message protection 114, each of which may be implemented as software executing on one or more computer systems. Thus, the various elements 102, 110, 112, 114 could execute on the same computing system or different systems. As one example, the electronic messaging system 150 is a corporate email system. However, the electronic messaging system 150 could be any email system such as a public email system. In one embodiment, the electronic messaging system 150 serves as an email host or server.

The electronic message transfer (EMT) 102 facilitates the transfer of the electronic messages between the electronic devices 101. In one embodiment, the EMT 102 is what is commonly referred to as a message transfer agent or mail transfer agent (MTA). In one embodiment, the EMT 102 may also be referred to as "mail server" or "mail exchanger". The EMT 102 may receive and relay the electronic messages using a protocol such as the Simple Mail Transfer Protocol (SMTP). However, the entire relay process is not necessarily compliant with SMTP. For example, within its own domain, the EMT 102 is not necessarily compliant with SMTP. As one example, the EMT 102 may serve as a gateway (e.g., email gateway). The gateway may control delivery of electronic messages into and out of a domain of the gateway.

For security, the content of the electronic messages may be encrypted. This not only protects the content during transmission, but prevents unauthorized recipients from reading/viewing the content. Electronic messages may be encrypted by electronic message encryption 110, in one embodiment. The EMT 102 may provide electronic messages to the electronic message encryption 110 for encryption. The decision on whether encryption is to be performed could be policy based. Another option is for encryption to be performed at the electronic device 101 that is sending the electronic message.

The forward message protection 114 tracks how an electronic message is forwarded and provides security for forwarded electronic messages. This history can be tracked in a computer readable storage device, as indicated by tracked electronic messages 155. In one embodiment, a recipient of a forwarded electronic message needs to be authorized by the original sender of the electronic message in order to be able to read the electronic message. Further details are provided below.

The electronic message decryption 112 is able to provide decryption keys to authorized recipients of electronic messages that have encrypted content. In one embodiment, a recipient of a forwarded electronic message having encrypted content needs to be authorized by the original sender of the electronic message in order to be able to receive a decryption key.

Electronic messaging system 150, webmail server 130, mail server 152, and electronic devices 101 may communicate by way of network(s) 105. The network 105 may represent one or more networks, which do not necessarily use the same communication protocol. In an embodiment, network 105 may be the Internet, a Wide Area Network (WAN) or a Local Area Network (LAN), singly or in combination. In embodiments, devices/systems 101, 130, 150, and/or 152 use one or more protocols to transfer information, such as Transmission Control Protocol/Internet Protocol (TCP/IP), Simple Mail Transfer Protocol (SMTP), etc. Information may be transferred between computing devices by wire and/or wirelessly in network 105.

Note that the physical location of the electronic devices 101a-101c is not intended to represent their relationship with the domain of the electronic messaging system 150. The following brief example in which the EMT 102 is a corporate email system will help to clarify. An employee of the company might compose an email (using a corporate email account and address) on electronic device 101a. After sending the email, it is received and processed by the EMT 102 prior to being relayed to the intended recipient. As noted, the EMT 102 might encrypt the content. In this example, the EMT 102 determines that the electronic message is addressed to a recipient outside of the corporate email system and determines to encrypt the content. The EMT 102 then relays the electronic message into network 105 where it is eventually received at mail server 152, for example. Mail server 152 may thus be outside the domain of the EMT 102. Mail server 152 then delivers the encrypted electronic message to, for example, electronic device 101b. The message could then be forwarded.

Figure 2:
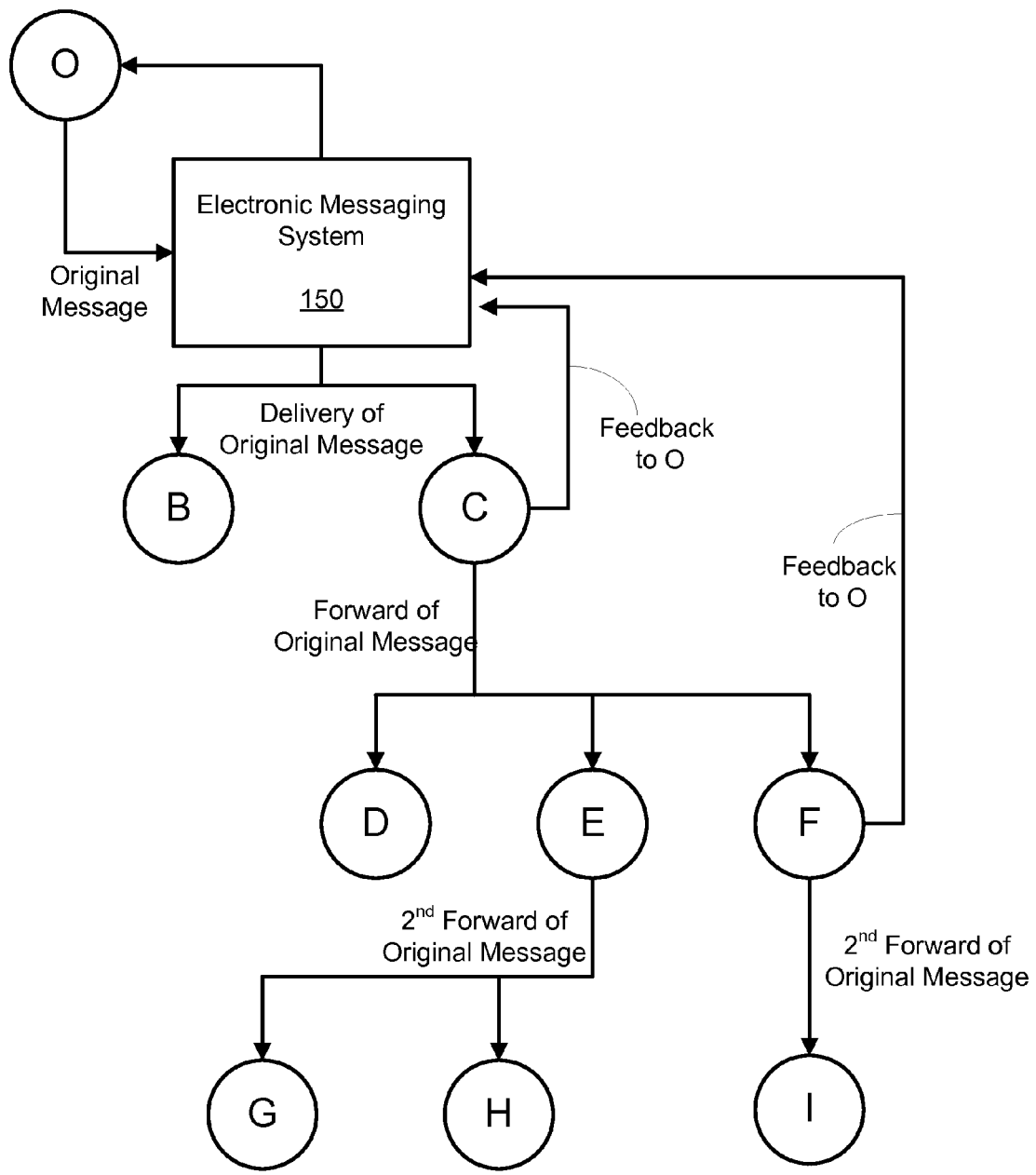
FIG. 2 is a diagram that illustrates one possible sequence of forwarding an electronic message, in accordance with embodiments.

FIG. 2 is a diagram that illustrates one possible sequence of forwarding an electronic message, in accordance with embodiments. "O" refers to an originator of an electronic message. "B" and "C" refer to intended recipients of the original electronic message. D-I refer to intended recipients of forwarded versions of the original electronic message. D-I are referred to as "forwarded recipients". Note that D-I are not intended by the originator as a recipient of the original electronic message.

The original electronic message is transferred to the electronic messaging system 150, where it may be encrypted. It could be encrypted elsewhere, such as at the originator's device 101. The electronic messaging system 150 facilitates delivery of the encrypted original electronic message to B and C. B and C need to be authorized to be able to obtain a decryption key, in one embodiment. As one example, the original electronic message is an email. A reason why the original electronic message passes through the electronic messaging system 150 may be that it serves as system that receives all emails sent by O, as well as all emails that are addressed to O.

C forwards the original electronic message to D, E, and F. The forwarded electronic message contains an encrypted version of the content of the original electronic message. C also provides feedback to the electronic messaging system 150 that indicates that C forwarded the original electronic message. As examples, C includes O as a .cc or a .bcc when forwarding the original electronic message. Other possibilities exist. Thus, this feedback may be an electronic message having O as an addressee.

Note that when D, E and F receive the encrypted content in the forwarded electronic message, they will need a decryption key to decrypt the content. However, O might not have provided authorization for D, E, and/or F to have access to the content. Note that in this example, it is assumed that the content of the forwarded electronic message is encrypted. For at least some electronic messages (e.g., emails), techniques exist that prevent a user such as C from forwarding the content as clear text.

In response to getting the feedback from C, the electronic messaging system 150 may determine that it needs to determine whether the recipients D, E, and/or F should be permitted access to the content. The electronic messaging system 150 could send an electronic message to O, requesting that O either grant or deny access. Other possibilities exist, as will be discussed below. For example, the electronic messaging system 150 may automatically determine a risk of allowing access to the content to a forwarded recipient based on machine learning algorithms, policies, etc. The forwarded recipients who are granted access may be provided with the decryption key. The electronic messaging system 150 may also store information that tracks the forwarding history of this message.

Proceeding on with the example, F forwards the electronic message to I, with the content remaining encrypted. F sends feedback to the electronic messaging system 150 that indicates that the electronic message was forwarded. As before, this could be achieved by forwarding the electronic message to I, and including O as a .cc or a .bcc. As with the previous example, the electronic messaging system 150 determines whether I is authorized to have access to the content.

When E forwards the electronic message to G and H, E fails to send feedback to the electronic messaging system 150 that indicates that the electronic message was forwarded. Again, the content received by G and H is encrypted. In this example, since the electronic messaging system 150 is not informed of the forwarding, it does not check to determine if G and/or H are authorized. If G and/or H were to request a decryption key in such a situation, they would be denied, in accordance with one embodiment.

As the process above proceeds, the electronic messaging system 150 may construct a forwarding history of the electronic message. The electronic messaging system 150 may also do so for other electronic messages sent by O. In one embodiment, the electronic messaging system 150 analyzes the forwarding history of the present electronic message and/or the other (previous) electronic messages to determine a security risk of authorizing one of the forwarded recipients (e.g., D-I) to have access to the content of the present electronic message.

Figure 3:
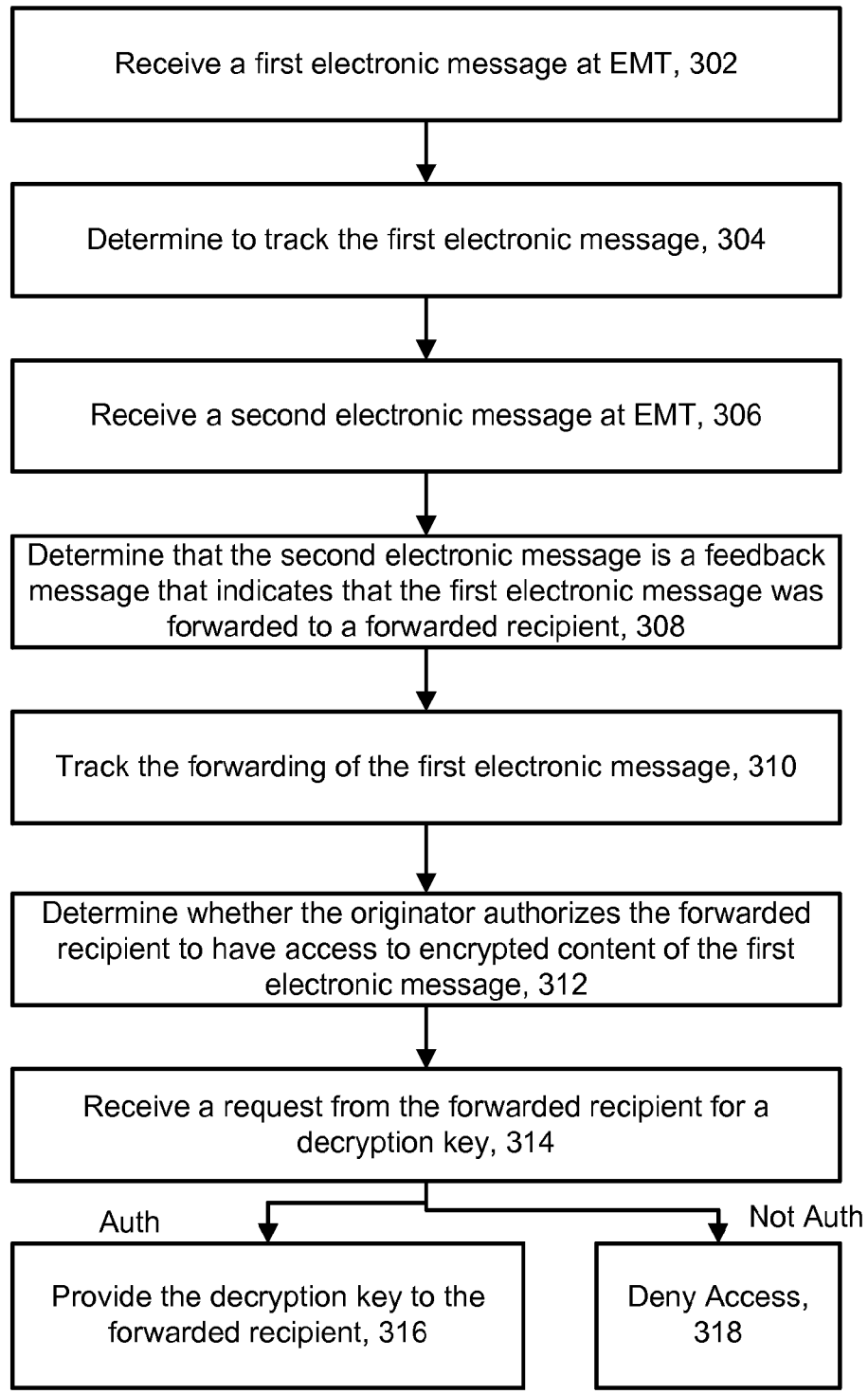
FIG. 3 is a flowchart of one embodiment of a process of providing security and tracking for forwarded electronic messages.

FIG. 3 is a flowchart of one embodiment of a process 300 of providing security and tracking for forwarded electronic messages. Various steps of process 300 could be performed within system 150. However, process 300 is not limited to system 150. Process 300 describes the tracking of one original message, such as in the example of FIG. 2. This process 300 may be repeated to track other electronic messages.

In step 302, a first electronic message from an originator is received at a computer system. As one example, the EMT 102 in the electronic messaging system 150 receives the electronic message. Referring to FIG. 2, step 302 may correspond to the electronic messaging system 150 receiving the original message from O. In one embodiment, the EMT 102 serves as an email host for the originator.

The originator is the sender of the first electronic message. Here, the originator or sender refers to an entity that sent the first electronic message. Typically, the originator has an electronic address, such as an email address. This electronic address may be specified in some portion of the electronic message, such as an email header. The originator could be a person, but this is not required. Instead, the originator might be an entity such as a business, organization, university, government agency, etc. The first electronic message might have been composed by a human or a machine. If composed by a human, one of the electronic devices 101 could have been used.

The first electronic message has one or more intended recipients. Typically, each intended recipient has an electronic address, such as an email address, associated with them. The electronic address of each recipient is specified in some portion of the first electronic message, such as an email header.

The first electronic message includes some content. In the event the first electronic message is an email, the content may be included in the body and/or in an attachment. The content may or may not be encrypted at this point. In one embodiment, the content is encrypted by electronic message encryption 110 prior to providing it to the first recipient. Steps of providing the first electronic message to the intended recipient, as well as the recipient's actions are not depicted in FIG. 3.

In step 304, the electronic message system 150 determines to track the first electronic message. This determination may be based on policies stored at the electronic messaging system 150. For example, emails that leave a domain may be tracked in accordance with one policy. In one embodiment, the EMT 102 serves as a gateway that sends and receives emails from other email systems. For example, the EMT 102 serves as gateway of an enterprise email system. Emails that leave the enterprise email system may be tracked, as one example. In one embodiment, the electronic message system 150 stores a message ID for all tracked messages in tracked electronic messages 155, in step 304.

In step 306, a second electronic message is received at a computer system. The second electronic message is a forwarded version of the first electronic message, in one embodiment. Referring to FIG. 2, this may be the feedback to O message from C, which gets received by the electronic messaging system 150. In one embodiment, this feedback is sent in response to C forwarding the first electronic message to D, E, and F. As one example, C includes O as a .cc or .bcc when forwarding the first electronic message.

In one embodiment, the EMT 102 that received the first electronic message also receives the second electronic message. The computer system that receives the second electronic message may or may not be the same computer system as the one that received the first electronic message, in step 302. The second electronic message may have the originator as an intended recipient. In one embodiment, the originator is being copied on this forwarded electronic message. The second electronic message may have an encrypted version of content of the first electronic message.

In step 308, a determination may be made (by, for example, the electronic messaging system 150) that the second electronic message is a feedback message that indicates that the first electronic message was forwarded. This may indicate that the first electronic message was forwarded to a forwarded recipient who was not intended by the originator as a recipient of the first electronic message. A variety of techniques can be used to determine that an electronic message is a feedback message that indicates that a message being tracked has been forwarded. Further details are discussed in connection with FIGS. 6A and 6B.

In step 310, the electronic messaging system 150 tracks the forwarding of the first electronic message. This step refers to building a history of how the first electronic message was forwarded, and storing this in tracked electronic messages 155.

In step 312, a determination is made whether the originator authorizes the forwarded recipient to have access to the encrypted content of the second electronic message. For example, the electronic messaging system 150 sends a message to O requesting whether D is authorized. In step 314, a request is received from the forwarded recipient for a decryption key.

Step 316 is taken if the forwarded recipient is authorized. In step 316, a decryption key for decrypting the encrypted content is provided to the forwarded recipient in response to determining that the originator authorized the forwarded recipient to have access to the encrypted content. If the forwarded recipient is not authorized, then the decryption key is not sent to the forwarded recipient, as reflected by the access denied in step 318.

Figure 4:
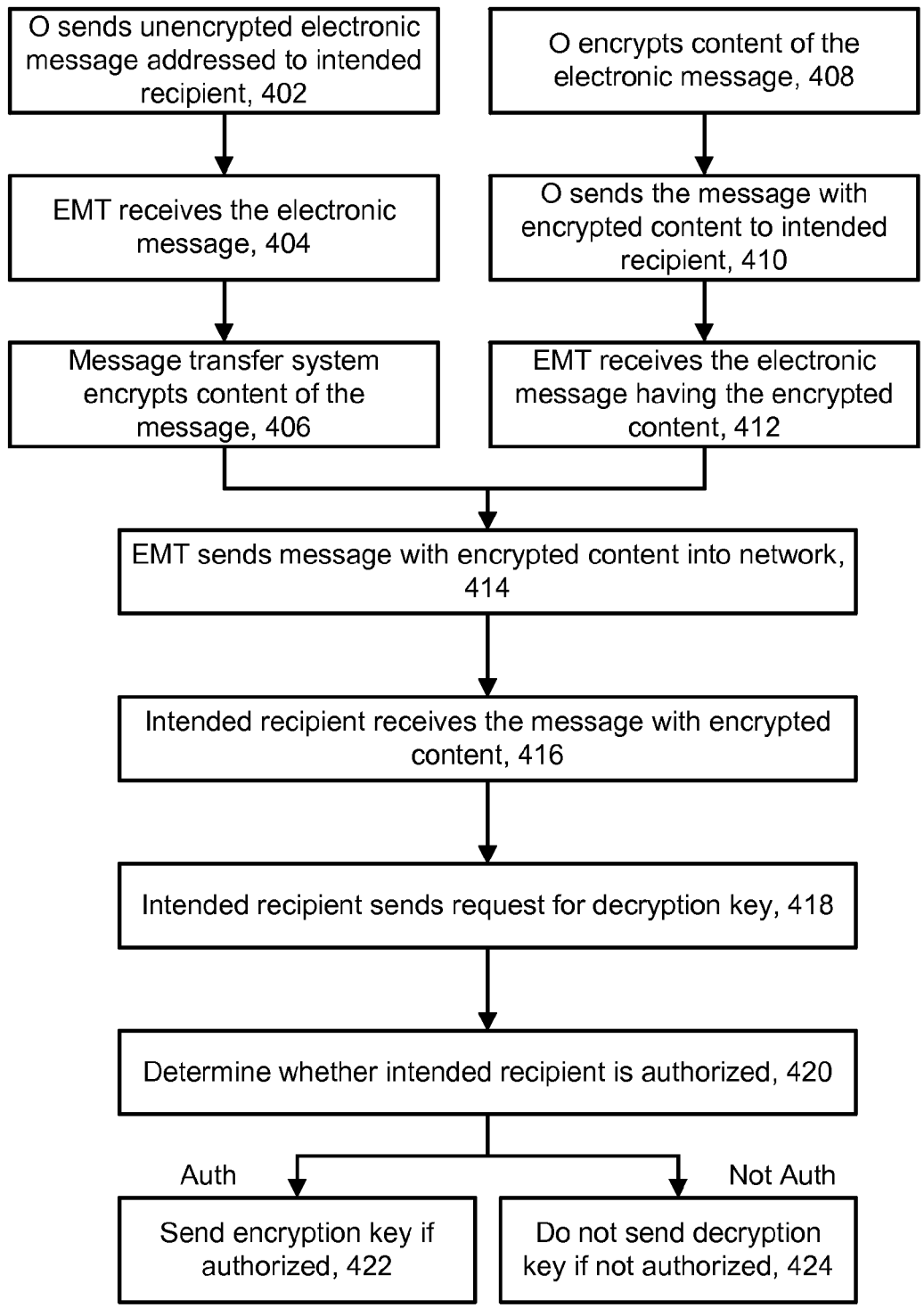
FIG. 4 is a flowchart of one embodiment of a process of allowing one or more initial recipients to have access to encrypted content of the original electronic message.

FIG. 4 is a flowchart of one embodiment of a process 400 of allowing one or more initial recipients to have access to encrypted content of the original electronic message. An example in which the original electronic message is an email will be discussed, but this is not intended to limit the electronic message to being an email.

The process starts with two options. In Option A, the originator sends the original electronic message into the network 105 without encrypting the content. For example, the originator uses electronic message application 104 or web browser to compose an email. The originator addresses the electronic message to an intended recipient and sends it using, for example, an email client, at step 404. The original electronic message is then received by the EMT 102. In one embodiment, the EMT 102 serves as a point at which any electronic messages, such as emails, addressed to or sent from the originator will be processed. Note that in this example, there is one intended recipient, but the process can be extended to any number of intended recipients.

In step 406, the EMT 102 provides the unencrypted electronic message to the electronic message encryption 110. Electronic message encryption 110 determines that the message should be encrypted, and performs the encryption. In one embodiment, electronic message encryption 110 enforces a set of policy rules to determine whether electronic messages should be encrypted. As one example, the electronic message encryption 110 determines that the policy rules require that the electronic messages sent outside of a corporate email system be encrypted.

In Option B, the originator encrypts content of the electronic message at the electronic device 101, in step 408. There may be an encryption program on the electronic device 101. As another example, a web application is used to encrypt the electronic message. The web application might be the electronic message encryption 110 at the electronic messaging system 150. In step 410, the originator sends the electronic message having encrypted content to the intended recipient. EMT 102 receives this message in step 412.

Note that in both Option A and B, the originator may pre-authorize the intended recipient(s) for access to the encrypted content.

In step 414, the EMT 102 relays the original electronic message having the encrypted content onward such that it will eventually get to the intended recipient. This includes transferring the original electronic message with the encrypted content in accordance with the SMTP, in one embodiment. There can be other transfer agents between the EMT 102 and the intended recipients. The message might be transferred out of the domain of the original sender, but it could also stay within the same domain. For example, if the EMT 102 is a corporate email system, the message may go outside of, or stay within, the corporate email system.

In step 416, the intended recipient receives the encrypted original electronic message. This could include the intended recipient using an electronic message application 104 (e.g., MUA) or a web browser 106 to access a webmail server 130, as two examples. For example, the encrypted original electronic message might be accessed from a mail server 152.

In step 418, the intended recipient requests a decryption key. This request may be made to the message transfer system 150. Specifically, this request could be made to the electronic message decryption 112. Note that this is an optional step, in that the intended recipient might already have the decryption key. In one embodiment, when the user attempts to open the encrypted content, they are presented with instructions to request the decryption key.

In step 420, the electronic message decryption 112 determines whether the intended recipient is authorized. In step 422, the electronic message decryption 112 sends the decryption key to authorized recipients, assuming authorization passes. Since the originator sent this email directly to this recipient, the originator may have pre-authorized the recipient. Of course, if for some reason, the recipient is not authorized, then the decryption key is not sent.

Figure 5:
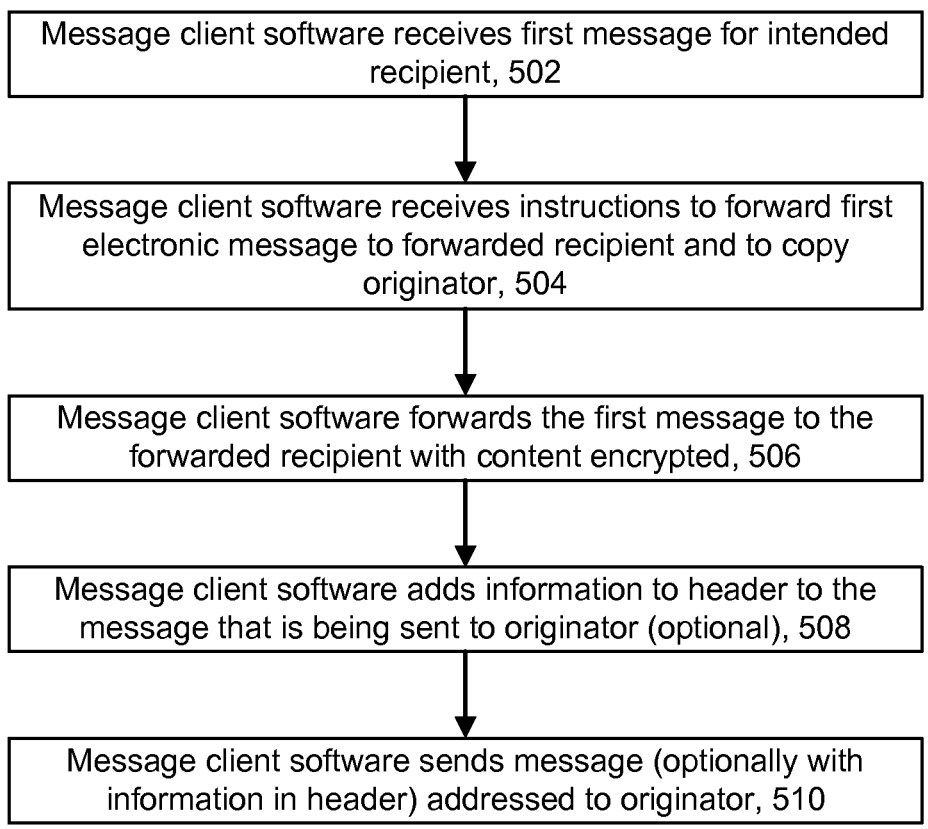
FIG. 5 is a flowchart of actions that are performed when an intended recipient receives and forwards an electronic message, in one embodiment.

FIG. 5 is a flowchart of actions that are performed when an intended recipient receives and forwards an electronic message, in one embodiment. The process 500 is performed by electronic message application 104, in one embodiment. The process 500 is performed by a combination of a web browser 106 and a web application, in one embodiment. Other possibilities exist. For the sake of discussion, the process 500 will be referred to as being performed by a message client. Note that a message client (e.g., email client) could execute on the electronic device 101, a webmail server 130, or a combination thereof.

In step 502, the message client receives the first electronic message. In step 504, the message client receives instructions to forward the first electronic message to a forwarded recipient and to provide a feedback message to the originator. For example, the user enters instructions into an email client to forward the first electronic message to the electronic address of the forwarded recipient. The forwarded recipient might not be intended by the originator as a recipient of the first electronic message, in this example. Also, the user might "carbon copy" (.cc) the originator or "blind carbon copy" (.bcc) the originator. That is, the electronic address of the originator may also be provided by the user.

In step 506, the message client forwards the first electronic message to the forwarded recipient.

In optional step 508, the message client adds information to a header of the electronic message that is addressed to the originator. This information indicates that the first electronic message was forwarded. In one embodiment, this is an "x-header" in an email header. However, other possibilities exist.

In step 510, the message client sends an electronic message (e.g., an email) to the originator. This email to the originator serves as the feedback message, in one embodiment. Note that this electronic message could take a variety of paths through, for example, various message transfer agents. As one example, a message client at device 101b sends the electronic message into network 105 and it is received by mail server 152. Mail server 152 relays the electronic message into network 105 such that it is eventually received by EMT 102. In this example, EMT 102 may serve as a system that receives all electronic messages of this type that are addressed for delivery to O. For example, EMT 102 may serve as an email host for O.

Figure 6A:
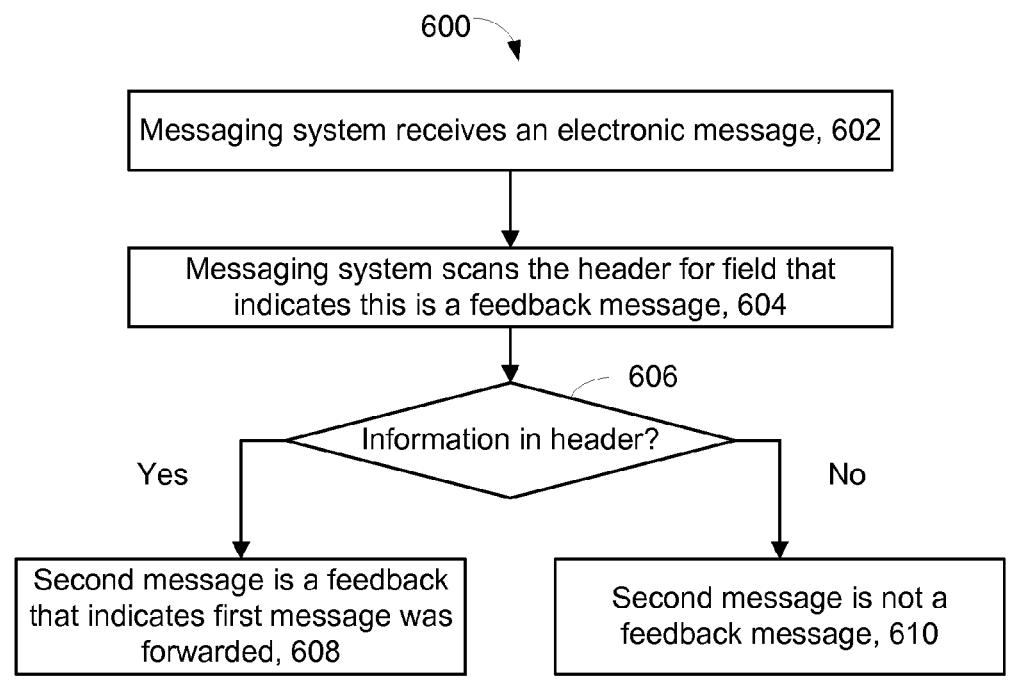
FIG. 6A is a flowchart of one embodiment of a process of the electronic message system determining that it has received a feedback message that indicates that the original electronic message was forwarded.

FIG. 6A is a flowchart of one embodiment of a process 600 of the electronic message system 150 determining that it has received a feedback message that indicates that the original electronic message was forwarded. This is one embodiment of step 308 from process 300. Process 600 assumes that information was added to the header of the feedback message.

In step 602, the electronic message system 150 receives an electronic message. In step 604, the electronic message system 150 scans the header of the received electronic message for the information that indicates that this is a feedback message. This may be the information that was added in step 508 of process 500. If the information is present (step 606 is yes), then the message is identified as a feedback message. If the information is not present (step 606 is no), then the message is identified as not being a feedback message.

Figure 6B:
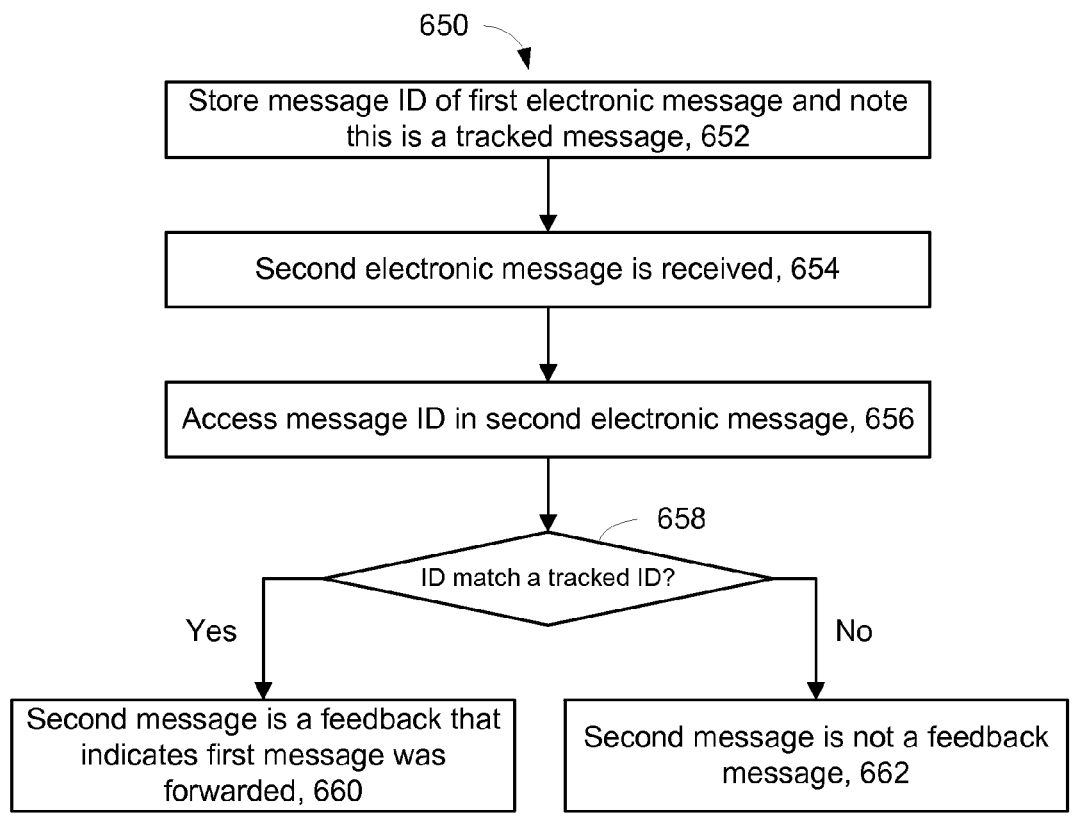
FIG. 6B is a flowchart of another embodiment of a process of the electronic messaging system determining that it has received a feedback message that indicates that the original electronic message was forwarded.

FIG. 6B is a flowchart of another embodiment of a process 650 of the electronic message system 150 determining that it has received a feedback message that indicates that the original electronic message was forwarded. Process 650 may be used by itself in combination with process 600. Process 650 begins in response to determining that an electronic message is to be tracked. In step 652, the electronic message system 150 stores a message ID and notes that this electronic message is being tracked. The message ID is from a header of the electronic message for which forwarding is being tracked, in one embodiment. Note other information, such as the originator and the intended recipients may also be stored.

In step 654, a second electronic message is received. For the sake of discussion, this is the feedback message.

In step 656, the electronic message system 150 accesses a message ID contained in the second electronic message. For at least some electronic messages, as the electronic message is being forwarded, the original message ID is kept in the message header. The electronic message system 150 is looking for such a message ID, in one embodiment.

In step 658, the electronic message system 150 determines whether the message ID in the message that was just received matches the message ID for any electronic messaged being tracked.

If there is a match, then the second electronic message is identified as a feedback that indicates that the first electronic message was forwarded, in step 660. Note that other information may also be used to determine that this is a feedback message, such as whether the second electronic message was addressed to the originator. As previously discussed, the feedback might have resulted from the originator being carbon copied (.cc) or blind carbon copied (.bcc). Thus, this may also be a factor in identifying the second message as a feedback message.

In one embodiment, the system 150 may examine whether there is encrypted content to make the determination. As noted herein, the system 150 may have encrypted the content of the first electronic message prior to it being relayed to the first intended recipient. Thus, the system 150 might expect the feedback message to also be encrypted.

If there is not a match for the message ID, then the second electronic message is identified as not being a feedback message, in step 662. Other factors may be used as previously discussed.

Figure 7:
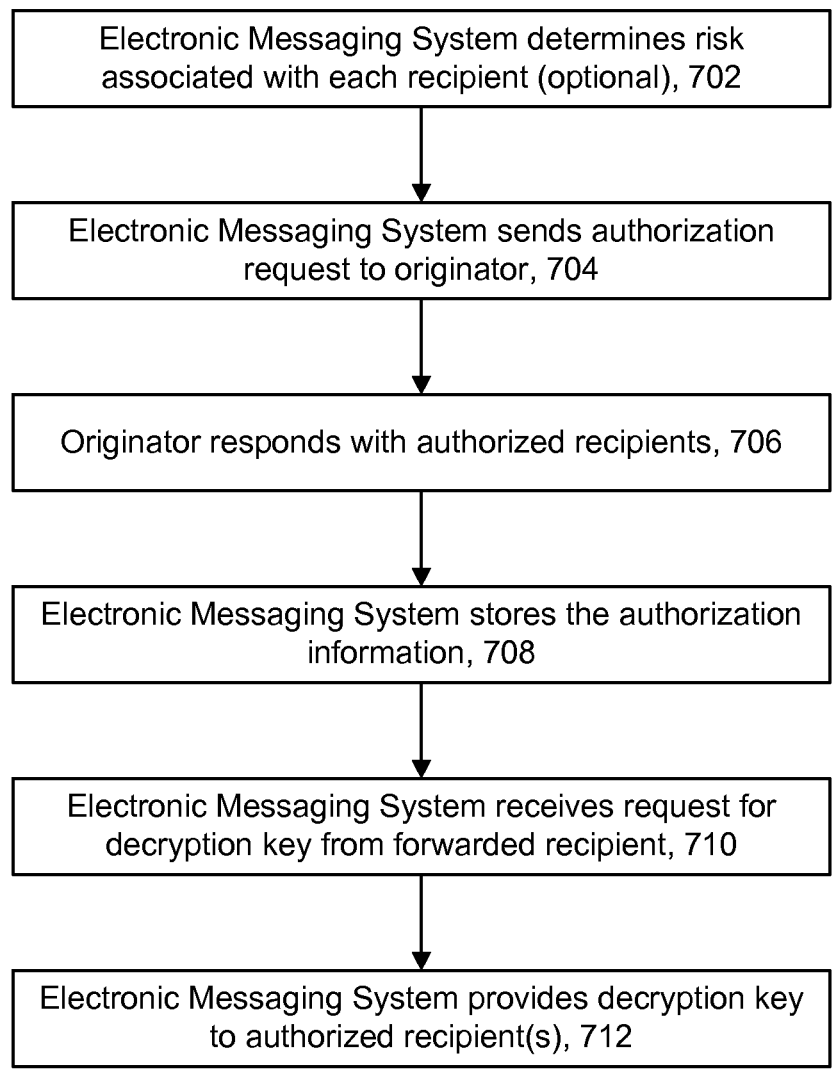
FIG. 7 is one embodiment of a process of determining whether a forwarded recipient should be provided a decryption key.

FIG. 7 is one embodiment of a process 700 of determining whether a forwarded recipient should be provided a decryption key. A "forwarded recipient" refers to an entity that was an intended recipient of a forwarded electronic message. This process may be initiated in response to the electronic messaging system 150 determining that it received a feedback message indicating that the original electronic message was forwarded.

In step 702, the forward message protection 114 determines a risk associated with authorizing each of the forwarded recipient(s). Further details of this step are discussed below.

In step 704, the forward message protection 114 sends an authorization request to the originator. This may be an electronic message to the originator requesting whether the forwarded recipient(s) are authorized to have access to the encrypted content of the electronic message. This is an email, in one embodiment. The authorization request may include a risk assessment of one or more of the forwarded recipient(s).

In step 706, the originator responds by indicating which of the forwarded recipient(s) are authorized. The originator may respond by sending an electronic message to the forward message protection 114. This could be a reply to the email of step 704, as one example.

In step 708, the forward message protection 114 stores the authorization information in computer readable storage. In step 710, the electronic message decryption 112 receives a request for a decryption key from one of the forwarded recipients. Note that when the forwarded recipient attempts to open the encrypted content of the original electronic message, a message can be displayed to instruct the user to request the decryption key.

In step 712, the electronic messaging system 150 checks whether the forwarded recipient is authorized, and provides the decryption key assuming the forwarded recipient is authorized. Of course, if the forwarded recipient is not authorized, then the request for the decryption key will be denied. In one embodiment, the electronic message decryption 112 requests that the forward message protection 114 indicate whether the forwarded recipient is authorized.

Figure 8:
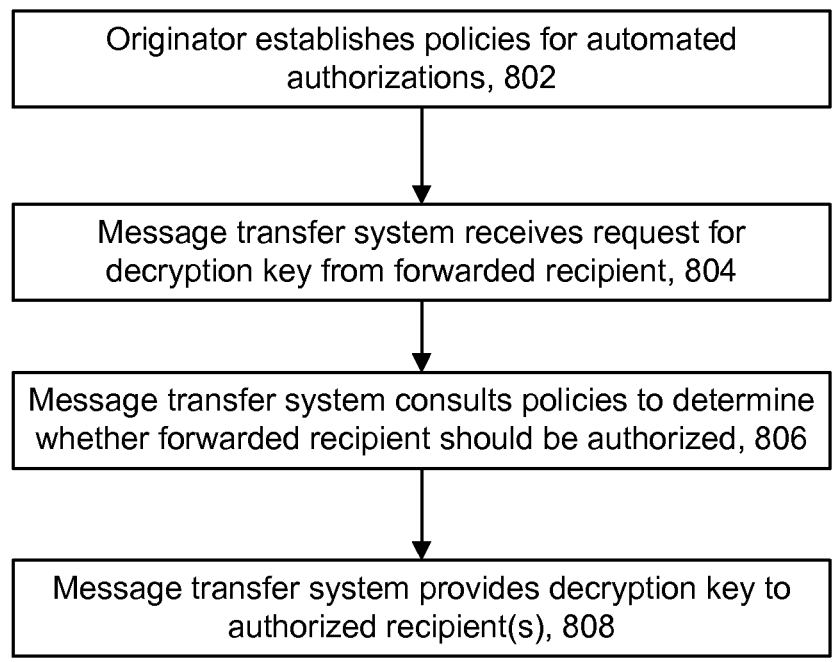
FIG. 8 is a flowchart of one embodiment of a process in which the authorization is at least partially automated.

The electronic message system 150 need not always send an authorization request to the originator. FIG. 8 is a flowchart of one embodiment of a process 800 in which the authorization is at least partially automated. In step 802, the originator establishes policies for automated authorizations. In step 804, the electronic message system 150 receives a request for a decryption key from a forwarded recipient. In step 806, the electronic message system 150 consults the policies to determine whether the forwarded recipient is authorized. In step 808, the electronic message system 150 provides the decryption key, assuming authorization passes.

Figure 9:
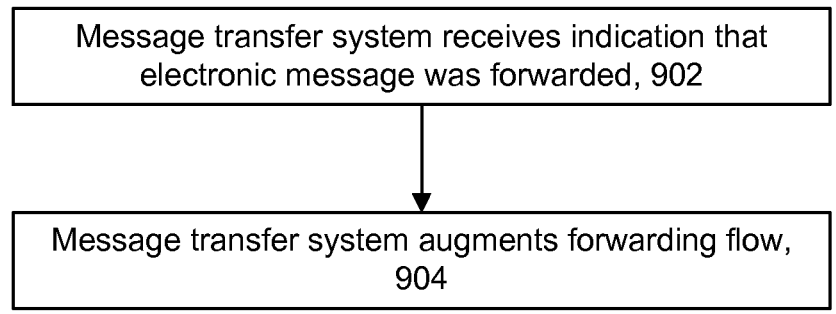
FIG. 9 is a flowchart of one embodiment of a process of tracking electronic messages.

One embodiment disclosed herein tracks the forwarding of electronic messages, such as emails. FIG. 9 is a flowchart of one embodiment of a process 900 of tracking electronic messages. In embodiment, the electronic message system 150 builds a data structure that describes how the electronic message was forwarded. FIG. 2 shows a conceptual representation of such a data structure. Note that prior to this process, the electronic message system 150 might have already learned that O send the original electronic message to B and C. Thus, this might by a starting point for the data structure.

In step 902, the electronic message system 150 receives an indication that an electronic message, such as an email, was forwarded. This is the feedback message previously discussed, in one embodiment. Using FIG. 2 as one example, the feedback message may contain information that indicates that O was the original sender and that C forwarded the electronic message to D, E, and F.

In step 904, the electronic message system 150 augments the data structure by adding additional nodes D, E, and F, as one example. As one option, the electronic message system 150 annotates that data structure to indicate whether the forwarded recipients were authorized by O. This authorization information may be used later on as information regarding the trustworthiness of forwarded recipient. For example, if O has a history of authorizing content forwarded to E from C, this may indicate E is considered a low risk.

Later, step 902 be repeated when F sends the feedback message. Thus, the data structure can be further augmented. Note that since E failed to send the feedback message in the example of FIG. 2, that the electronic message system 150 would not be aware of that part of the forwarding path.

Figure 10:
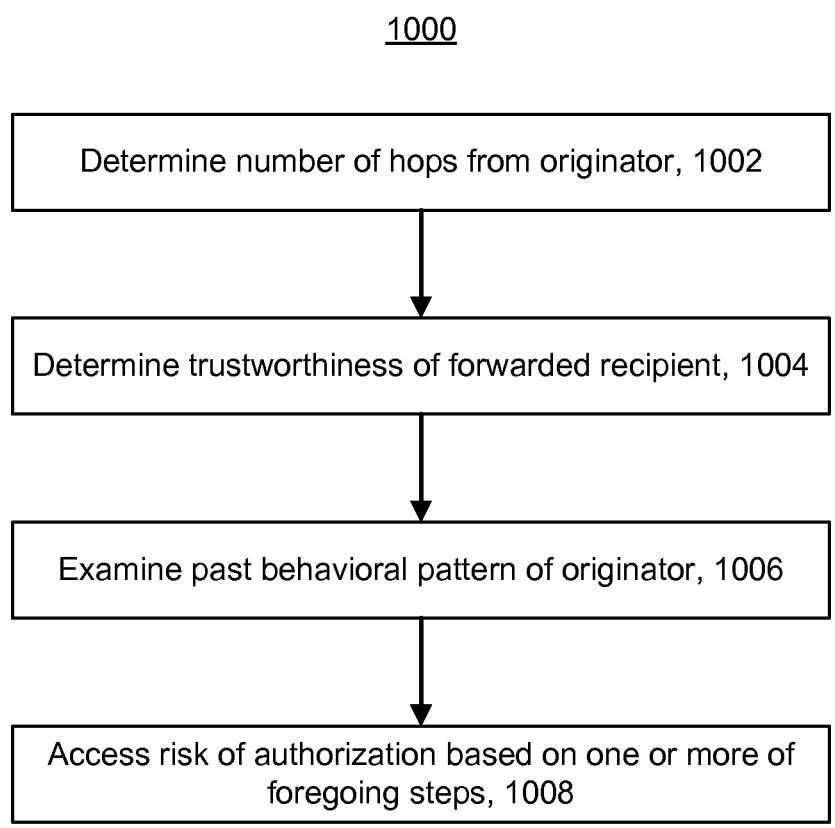
FIG. 10 is a flowchart of one embodiment of accessing the risk of authorizing a forwarded recipient.

FIG. 10 is a flowchart of one embodiment of a process 1000 of assessing the risk of authorizing a forwarded recipient. This is one embodiment of step 702 from FIG. 7. Step 1002 includes determining how many hops have been made from the originator to the forwarded recipient. This may be based on the tracking structure built in process 900.

Step 1004 includes determining a general trustworthiness of the forwarded recipient. For example the electronic message system 150 might analyze tendencies of this forwarded recipient being authorized or denied in general. Other factors may be considered such as security clearance, role in an organization, etc.

Step 1006 includes examining past behavior of the originator. This may include determining whether the originator has authorized the forwarded recipient in the past. It might also examine data structures built using the process of FIG. 9. These could be used to determine past behavior of the originator in similar circumstances.

In step 1008, the risk of authorizing the forwarded recipient is determined based on one or more of steps 1002, 1004, and/or 1006. As one example, a security risk of authorizing the forwarded recipient to have access to the encrypted content is determined based on the forwarding history of the first electronic message and the forwarding history of the other electronic messages sent by the originator.

The determination in step 1008 uses machine learning, in one embodiment. Machine learning can be used to train the electronic messaging system 150 to learn to how to assess the risk of authorizing the forwarded recipient based on the forwarding history. After the system is trained, it can then be used to automatically determine the risk.

The determination is step 1008 is rule based, in one embodiment. The rules may be provided by the originator, the originator's employer, etc. For example, the originator may provide a rule that states that if the originator has authorized the forwarding of an email to a particular forwarded recipient in the past, then that recipient may automatically be authorized in the future. Another example rule is to require the previous authorization of the forwarded recipient to involve the same forwarding path. Many other rules could be used. Note that a rule based embodiment allows the system 150 to automatically assess the risk.

Figure 11:
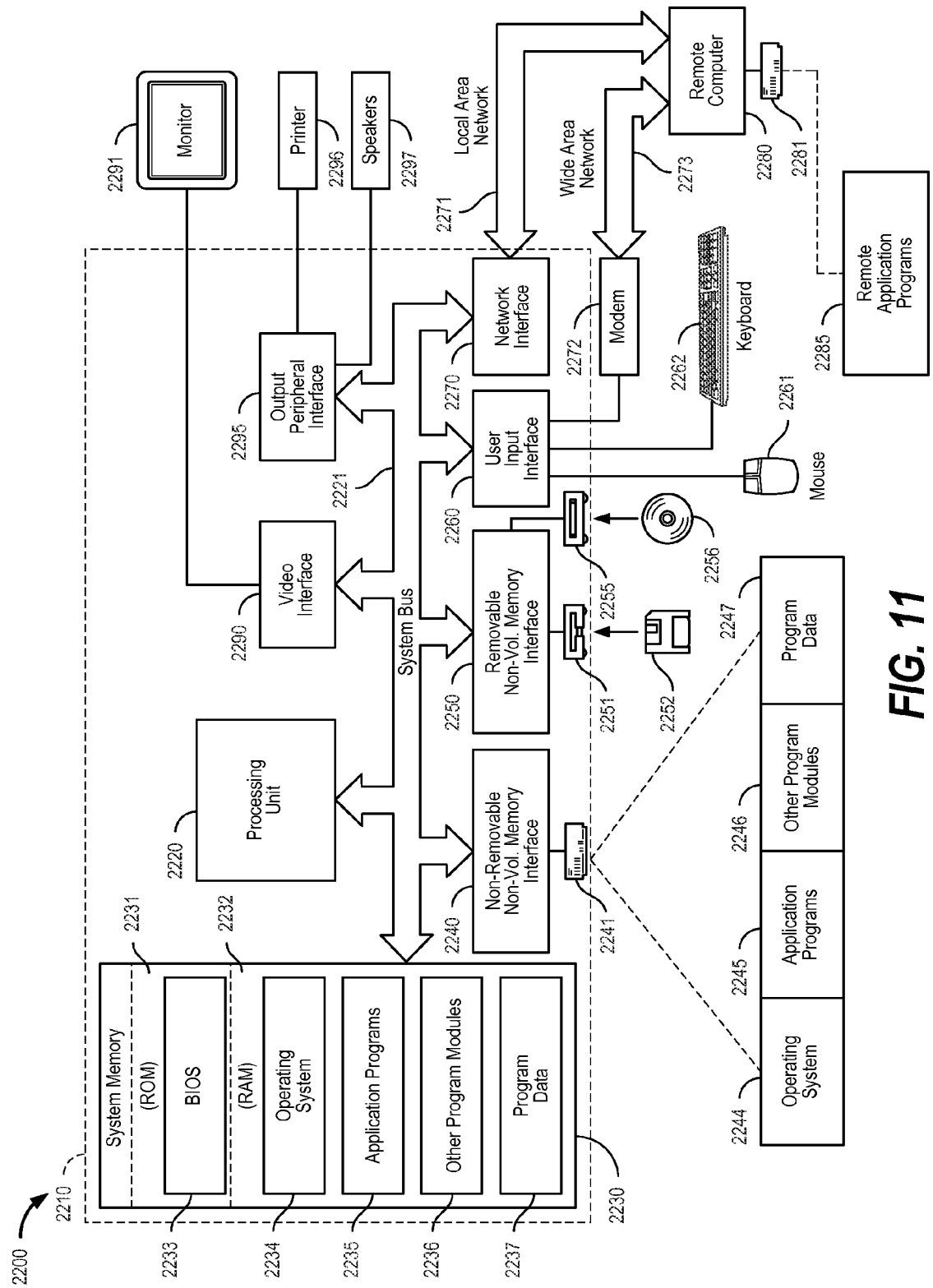
FIG. 11 is a block diagram of a computing device environment according to an embodiment.

The disclosed technology may be used with various computing systems or computing devices. FIG. 11 is a block diagram of an embodiment of a system environment 2200. Computing system environment 2200 includes a general purpose computing device in the form of a computer 2210. In an embodiment, computing devices 150, 152, 130, and/or computing devices 101 shown in FIG. 1 correspond to computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application programs 2235, other program modules 2236, and program data 2237. In an embodiment, computer program code as described herein may be at least partially stored in application programs 2235.

The computer 2210 may also include other removable/non-removable, volatile/nonvolatile computer storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250.

The drives and their associated computer storage media described above provide storage of computer readable instructions, data structures, program modules and other data for the computer 2210. Hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. In an embodiment, Applications 108-109 and 112-113 shown FIG. 1 correspond to application programs 2245 and user interfaces 110 and 111 shown in FIG. 1 correspond to operating system 2244. In an embodiment, user interfaces 110 and 111 are natural language interfaces and/or touch surfaces for user speech, touch or gesture input and output.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210. The logical connections may include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application programs 2285 may reside on memory device 2281. It will be appreciated that the network connections shown are exemplary and other means of establishing a communications link between the computers may be used.

One embodiment described herein includes apparatus comprising a processor readable storage device and a processor. The processor determines to track forwarding of a first electronic message. The first electronic message comprises content. The first electronic message identifies an originator of the first electronic message and an intended recipient of the first electronic message. The processor accesses a second electronic message that is addressed for delivery to the originator. The processor determines that the second electronic message is a feedback message that indicates that the first electronic message was forwarded by the intended recipient to a forwarded recipient that was not intended by the originator as a recipient of the first electronic message. The processor tracks a forwarding history of the first electronic message, comprising storing the forwarding history in the processor readable storage device. The forwarding history indicates that the first electronic message was forwarded from the intended recipient to the forwarded recipient.

One embodiment described herein includes a computer program product, comprising a computer readable storage device having computer readable program code embodied therewith. The computer readable program code comprises computer readable program code configured to determine to track forwarding of a first electronic message. The first electronic message comprises content and identifies an originator of the first electronic message and an intended recipient of the first electronic message. The computer readable program code is configured to access a second electronic message that is addressed for delivery to the originator. The computer readable program code is configured to determine that the second electronic message is a feedback message that indicates that the first electronic message was forwarded by the intended recipient to a forwarded recipient that was not intended by the originator as a recipient of the first electronic message. The computer readable program code is configured to track a forwarding history of the first electronic message, comprising storing the forwarding history in the processor readable storage device. The forwarding history indicates that the first electronic message was forwarded from the intended recipient to the forwarded recipient.

The flowchart, sequence diagrams and block diagrams in the Figures illustrate the architecture, functionality, and operation of possible implementations of systems, methods and computer program products according to various aspects of the present disclosure. In this regard, each block in the flowchart or block diagram (or arrow in sequence diagram) may represent a module, segment, or portion of code, which comprises one or more executable instructions for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of processing electronic messages, the method comprising:
   determining, by an electronic messaging system, to track forwarding of a first electronic message that is received at a computer system in the electronic messaging system, the first electronic message identifying an originator of the first electronic message and an intended recipient of the first electronic message;
   accessing a second electronic message that is addressed for delivery to the originator, wherein the second electronic message is accessed at a computer system in the electronic messaging system;
   determining, by the electronic messaging system, that the second electronic message is a feedback message that indicates that the first electronic message was forwarded by the intended recipient to a forwarded recipient, the forwarded recipient not being intended by the originator as a recipient of the first electronic message;
   tracking, by the electronic messaging system a forwarding history of the first electronic message, comprising storing the forwarding history in a storage device, wherein the forwarding history indicates that the first electronic message was forwarded from the intended recipient to the forwarded recipient;
   automatically determining, by the electronic messaging system, a security risk of authorizing the forwarded recipient to have access to content of the first electronic message, wherein the determining a security risk is based on the forwarding history of the first electronic message and forwarding history of other electronic messages sent by the originator; and
   providing, from the electronic messaging system to the originator, a security risk of authorizing the forwarded recipient to have access to the content of the first electronic message.

2. The method of claim 1, wherein the forwarded first electronic message comprises encrypted content, and further comprising:
   determining, by the electronic messaging system, whether the originator authorizes the forwarded recipient to have access to encrypted content; and
   providing, from the electronic messaging system to the forwarded recipient, a decryption key for decrypting the encrypted content after determining that the originator authorized the forwarded recipient to have access to the encrypted content.

3. The method of claim 1, wherein the forwarded recipient is a first forwarded recipient, wherein the tracking the forwarding history comprises:
   accessing, by the electronic messaging system, a third electronic message that is addressed for delivery to the originator, wherein the third electronic message is accessed at a computer system;
   determining, by the electronic messaging system, that the third electronic message is a feedback message that indicates that the first electronic message was forwarded by the first forwarded recipient to a second forwarded recipient, neither the first forwarded recipient nor the second forwarded recipient were intended by the originator as recipients of the first electronic message; and
   adding, by the electronic messaging system, to the forwarding history that the first electronic message was forwarded from the first forwarded recipient to the second forwarded recipient.

4. The method of claim 1, wherein the determining that the second electronic message is a feedback message that indicates that the first electronic message was forwarded comprises:
   determining, by the electronic messaging system, that the second electronic message is a forwarded version of the first electronic message, the forwarded version being addressed to the originator, the forwarded version identifying the forwarded recipient.

5. The method of claim 1, wherein the determining that the second electronic message is a feedback message that indicates that the first electronic message was forwarded comprises:
   storing, by the electronic messaging system, message identifiers in computer readable storage in response to determining that electronic messages are to be tracked, comprising storing a message identifier for the first electronic message;
   accessing, by the electronic messaging system, a message identifier from the second electronic message; and
   determining, by the electronic messaging system, the message identifier from the second electronic message matches the message identifier for the first electronic message.

6. The method of claim 1, wherein the electronic messaging system processes all emails that are sent by or received by the originator.

7. The method of claim 1, further comprising:
   automatically adding, by the electronic messaging system, information to a header of the second electronic message in response to the intended recipient forwarding the first electronic message to the forwarded recipient, wherein the information indicates that the second electronic message is a feedback message that indicates that the first electronic message was forwarded by the intended recipient to the forwarded recipient.

8. An apparatus comprising:
   a processor readable storage device; and
   a processor that:
   determines to track forwarding of a first electronic message, the first electronic message comprising content, the first electronic message identifying an originator of the first electronic message and an intended recipient of the first electronic message;
   accesses a second electronic message that is addressed for delivery to the originator;
   determines that the second electronic message is a feedback message that indicates that the first electronic message was forwarded by the intended recipient to a forwarded recipient that was not intended by the originator as a recipient of the first electronic message; and
   tracks a forwarding history of the first electronic message, comprising storing the forwarding history in the processor readable storage device, wherein the forwarding history indicates that the first electronic message was forwarded from the intended recipient to the forwarded recipient;
   tracks forwarding history of other electronic messages sent by the originator;
   determines a security risk of authorizing the forwarded recipient to have access to encrypted content of the first electronic message based on the following history of the first electronic message and the forwarding history of the other electronic messages sent by the originator; and provides, to the originator, the security risk of authorizing the forwarded recipient to have access to the encrypted content of the first electronic message.

9. The apparatus of claim 8, wherein the processor:

encrypts the content of the first electronic message prior to the first electronic message being transmitted to the intended recipient;

automatically determines whether the originator authorizes the forwarded recipient to have access to encrypted content of the first electronic message; and provides, to the forwarded recipient, a decryption key for decrypting the encrypted content after determining that the originator authorized the forwarded recipient to have access to the encrypted content.

10. The apparatus of claim 8, wherein the forwarded recipient is a first forwarded recipient, wherein the processor:

determines that a third electronic message is a feedback message that indicates that the first electronic message was forwarded by the first forwarded recipient to a second forwarded recipient, wherein neither the first forwarded recipient nor the second forwarded recipient were intended by the originator as recipients of the first electronic message, wherein the third electronic message is addressed to the originator; and adds to the forwarding history that the first electronic message was forwarded from the first forwarded recipient to the second forwarded recipient.

11. The apparatus of claim 8 wherein, to determine that the second electronic message is a feedback message, the processor:

determines that the second electronic message is a forwarded version of the first electronic message, the forwarded version lists the forwarded recipient as an addressee and the originator as an addressee.

12. The apparatus of claim 8 wherein, to determine that the second electronic message is a feedback message that indicates that the first electronic message was forwarded, the processor:

stores message identifiers, comprising a first message identifier for the first electronic message, in the processor readable storage device in response to determining to track electronic messages;

accesses a message identifier from a header of the second electronic message; and determines that the message identifier from the second electronic message matches in the first message identifier for the first electronic message.

13. The apparatus of claim 8, wherein the processor:

serves as a gateway that controls delivery of electronic messages into and out of a domain of the gateway.

14. A computer program product, comprising:

a computer readable storage device having computer readable program code embodied therewith, the computer readable program code comprising:

computer readable program code configured to determine to track forwarding of a first electronic message, the first electronic message comprising content, the first electronic message identifying an originator of the first electronic message and an intended recipient of the first electronic message;

computer readable program code configured to access a second electronic message that is addressed for delivery to the originator;

computer readable program code configured to determine that the second electronic message is a feedback message that indicates that the first electronic message was forwarded by the intended recipient to a forwarded recipient that was not intended by the originator as a recipient of the first electronic message;

computer readable program code configured to track a forwarding history of the first electronic message, comprising storing the forwarding history, wherein the forwarding history indicates that the first electronic message was forwarded from the intended recipient to the forwarded recipient;

computer readable program code configured to track forwarding history of other electronic messages sent by the originator;

computer readable program code configured to determine a security risk of authorizing the forwarded recipient to have access to encrypted content of the first electronic message based on the forwarding history of the first electronic message and the forwarding history of the other electronic messages sent by the originator; and computer readable program code configured to provide, to the originator, the security risk of authorizing the forwarded recipient to have access to the encrypted content of the first electronic message.

15. The computer program product of claim 14, further comprising:

computer readable program code configured to encrypt the content of the first electronic message prior to the first electronic message being transmitted to the intended recipient;

computer readable program code configured to determine whether the originator authorizes the forwarded recipient to have access to the encrypted content of the forwarded first electronic message; and computer readable program code configured to provide, to the forwarded recipient, a decryption key for decrypting the encrypted content after determining that the originator authorized the forwarded recipient to have access to the encrypted content.

16. The computer program product of claim 14, wherein the forwarded recipient is a first forwarded recipient, wherein the computer readable program code configured to track the forwarding history comprises computer readable program code configured to determine that a third electronic message is a feedback message that indicates that the first electronic message was forwarded by the first forwarded recipient to a second forwarded recipient, wherein neither the first forwarded recipient nor the second forwarded recipient were intended by the originator as recipients of the first electronic message, wherein the third electronic message is addressed to the originator; and computer readable program code configured to add to the forwarding history that the first electronic message was forwarded from the first forwarded recipient to the second forwarded recipient.

17. The computer program product of claim 14, wherein the computer readable program code configured to determine that the second electronic message is a feedback message that indicates that the first electronic message was forwarded comprises computer readable program code configured to determine that the second electronic message is a forwarded version of the first electronic message, the forwarded version identifying the forwarded recipient as a first addressee and the originator as a second addressee.

18. The computer program product of claim 14, wherein the computer readable program code configured to determine that the second electronic message is a feedback message that indicates that the first electronic message was forwarded comprises computer readable program code configured to store a first message identifier for the first electronic message in response to determining to track the first electronic message, computer readable program code configured to access a message identifier from the second electronic message, and computer readable program code configured to determine the message identifier from the second electronic message matches the first message identifier.

\* \* \* \* \*